(12) United States Patent
Robins et al.

(10) Patent No.: US 9,238,335 B2
(45) Date of Patent: Jan. 19, 2016

(54) MANDREL FOR AUTOCLAVE CURING APPLICATIONS

(75) Inventors: Brian G. Robins, Renton, WA (US); Kurtis Willden, Kent, WA (US); Ethan W. Hunter, Havertown, PA (US); Nika McManus, Drexel Hill, PA (US)

(73) Assignee: THE BOEING COMPANY, Chicago, IL (US)

( * ) Notice: Subject to any disclaimer, the term of this patent is extended or adjusted under 35 U.S.C. 154(b) by 497 days.

(21) Appl. No.: 12/350,928

(22) Filed: Jan. 8, 2009

(65) Prior Publication Data

US 2010/0009124 A1    Jan. 14, 2010

Related U.S. Application Data

(63) Continuation-in-part of application No. 12/170,843, filed on Jul. 10, 2008.

(51) Int. Cl.
| | |
|---|---|
| *B29C 70/44* | (2006.01) |
| *B29C 33/40* | (2006.01) |
| *B29C 33/50* | (2006.01) |
| *B29C 33/76* | (2006.01) |
| *B29C 70/54* | (2006.01) |
| *B29D 99/00* | (2010.01) |
| *B64C 1/06* | (2006.01) |
| *B29C 33/38* | (2006.01) |
| *B29L 31/30* | (2006.01) |

(52) U.S. Cl.
CPC .............. *B29C 70/44* (2013.01); *B29C 33/405* (2013.01); *B29C 33/50* (2013.01); *B29C 33/76* (2013.01); *B29C 70/54* (2013.01); *B29D 99/001* (2013.01); *B29C 33/3835* (2013.01); *B29L 2031/3076* (2013.01); *B64C 1/064* (2013.01); *B64C 1/065* (2013.01); *Y10T 428/24479* (2015.01)

(58) Field of Classification Search
CPC .... B29C 33/405; B29C 33/50; B29C 33/505; B29C 33/76; B29C 2043/3652; B29C 70/44; B29C 70/446
See application file for complete search history.

(56) References Cited

U.S. PATENT DOCUMENTS

| | | | | |
|---|---|---|---|---|
| 2,485,898 | A | * | 10/1949 | Mathews et al. ................ 249/65 |
| 3,306,767 | A | | 2/1967 | Snyder |
| 3,610,563 | A | * | 10/1971 | Allen ............................... 249/65 |
| 3,700,512 | A | | 10/1972 | Pearson et al. |
| 3,764,641 | A | | 10/1973 | Ash |
| 3,795,559 | A | * | 3/1974 | Horn et al. .................... 156/152 |
| 4,087,502 | A | | 5/1978 | Hoffmeister |

(Continued)

FOREIGN PATENT DOCUMENTS

| | | | |
|---|---|---|---|
| JP | 03085680 A | * | 4/1991 |
| JP | 06071654 A | * | 3/1994 |

(Continued)

OTHER PUBLICATIONS

Machine translation of Japanese Patent Publication JP-06071654A, 8 pages.*

(Continued)

*Primary Examiner* — William Bell
(74) *Attorney, Agent, or Firm* — Yee & Associates, P.C.

(57) ABSTRACT

A mandrel used to cure a composite part layup has an elastic body and at least one internal open space therein. The internal open space is configured to allow substantially uniform thermal expansion of the body during curing.

8 Claims, 6 Drawing Sheets

(56) References Cited

U.S. PATENT DOCUMENTS

| | | | |
|---|---|---|---|
| 4,662,587 A | 5/1987 | Whitener | |
| 4,675,061 A | 6/1987 | Mead | |
| 4,681,724 A | 7/1987 | Faiz et al. | |
| 4,780,262 A | 10/1988 | Vonvolkli | |
| 4,946,526 A | 8/1990 | Petty-Galis et al. | |
| 5,013,514 A | 5/1991 | Azzani | |
| 5,259,901 A | 11/1993 | Davis | |
| 5,354,195 A | 10/1994 | Dublinski et al. | |
| 5,368,807 A | 11/1994 | Lindsay | |
| 5,382,150 A | 1/1995 | Henrio | |
| 5,387,098 A | 2/1995 | Willden | |
| 5,397,524 A | 3/1995 | Phillips | |
| 5,425,628 A | 6/1995 | Kitson | |
| 5,469,686 A | 11/1995 | Pykiet | |
| 5,507,341 A | 4/1996 | Eslinger | |
| 5,538,589 A | 7/1996 | Jensen | |
| 5,605,195 A | 2/1997 | Eslinger | |
| 5,645,668 A | 7/1997 | Lin | |
| 5,707,576 A | 1/1998 | Asher | |
| 5,817,269 A * | 10/1998 | Younie et al. | 264/258 |
| 5,897,818 A | 4/1999 | Lewit et al. | |
| 6,458,309 B1 | 10/2002 | Allen et al. | |
| 6,497,190 B1 | 12/2002 | Lewit | |
| 6,510,961 B1 | 1/2003 | Head et al. | |
| 6,613,258 B1 | 9/2003 | Maison et al. | |
| 6,692,681 B1 | 2/2004 | Lunde | |
| 6,743,504 B1 | 6/2004 | Allen et al. | |
| 6,746,642 B2 | 6/2004 | Buge et al. | |
| 6,749,171 B2 | 6/2004 | Takagi | |
| 7,052,572 B2 * | 5/2006 | Miura et al. | 156/286 |
| 7,074,474 B2 | 7/2006 | Toi et al. | |
| 7,083,698 B2 | 8/2006 | Engwall | |
| 7,138,031 B2 | 11/2006 | Erickson et al. | |
| 7,204,951 B2 | 4/2007 | Simpson et al. | |
| 7,293,737 B2 | 11/2007 | Engwall | |
| 7,294,220 B2 | 11/2007 | Anderson | |
| 7,338,703 B2 | 3/2008 | Merriman | |
| 7,357,166 B2 | 4/2008 | Pham | |
| 7,419,130 B2 | 9/2008 | Peery | |
| 7,445,744 B2 | 11/2008 | Simpson et al. | |
| 7,459,048 B2 | 12/2008 | Pham et al. | |
| 7,527,222 B2 | 5/2009 | Biornstad et al. | |
| 7,790,082 B2 | 9/2010 | Buge et al. | |
| 7,815,160 B2 | 10/2010 | Stenard | |
| 7,824,171 B2 | 11/2010 | Hanson et al. | |
| 7,861,969 B2 | 1/2011 | Guzman et al. | |
| 7,879,276 B2 | 2/2011 | Guzman et al. | |
| 7,897,225 B2 | 3/2011 | Campbell et al. | |
| 7,972,466 B2 | 7/2011 | Martinez Cerezo et al. | |
| 7,998,299 B2 | 8/2011 | McCarville et al. | |
| 2002/0178992 A1 | 12/2002 | Lewit | |
| 2004/0070108 A1 | 4/2004 | Simpson et al. | |
| 2005/0051262 A1 | 3/2005 | Erickson et al. | |
| 2005/0161154 A1 | 7/2005 | Anderson | |
| 2005/0230552 A1 | 10/2005 | Engwall et al. | |
| 2007/0044904 A1 | 3/2007 | Mead et al. | |
| 2007/0096368 A1 | 5/2007 | Hanson | |
| 2008/0131716 A1 | 6/2008 | Ridges | |
| 2008/0277531 A1 | 11/2008 | Ackermann et al. | |
| 2008/0290214 A1 | 11/2008 | Guzman et al. | |
| 2008/0302912 A1 | 12/2008 | Yip et al. | |
| 2009/0127393 A1 | 5/2009 | Guzman et al. | |
| 2009/0206504 A1 | 8/2009 | Campbell et al. | |
| 2009/0294040 A1 * | 12/2009 | Fernandez et al. | 156/245 |
| 2010/0006739 A1 | 1/2010 | Robins et al. | |
| 2010/0024964 A1 | 2/2010 | Ingram, Jr. et al. | |
| 2010/0129589 A1 | 5/2010 | Senibi et al. | |

FOREIGN PATENT DOCUMENTS

| | | |
|---|---|---|
| WO | 9851481 A1 | 11/1998 |
| WO | 2005105402 A1 | 11/2005 |
| WO | 2008003715 A1 | 1/2008 |
| WO | 2008003721 A1 | 1/2008 |
| WO | 2008003733 A1 | 1/2008 |
| WO | PCT/US2009/048889 | 2/2009 |
| WO | 2010005811 A1 | 1/2010 |

OTHER PUBLICATIONS

Webster's New Collegiate Dictionary, G. & C. Merriam Co., 1977, pp. 1279-1280.*
USPTO Final Office Action, dated Apr. 25, 2012, regarding U.S. Appl. No. 12/170,843, 24 pages.
International Search Report dated Feb. 10, 2009, regarding Application No. PCT/US2009/048889 (WO 2010/005811), 3 pages.
USPTO Office Action, dated Sep. 27, 2010, regarding U.S. Appl. No. 12/170,843, 10 pages.
Response to Office Action, dated Dec. 27, 2010, regarding U.S. Appl. No. 12/170,843, 16 pages.
USPTO Final Office Action, dated Feb. 8, 2011, regarding U.S. Appl. No. 12/170,843, 11 pages.
Response to Final Office Action, dated May 2, 2011, regarding U.S. Appl. No. 12/170,843, 20 pages.
USPTO Office Action, dated Nov. 9, 2011, regarding U.S. Appl. No. 12/170,843, 12 pages.
Response to Office Action, dated Feb. 8, 2012, regarding U.S. Appl. No. 12/170,843, 16 pages.
International Search Report dated Oct. 2, 2009, regarding Application No. PCT/US2009/048889 (WO 2010/005811), 3 pages.
Office Action, dated May 1, 2014, regarding U.S. Appl. No. 12/170,843, 18 pages.
Final Office Action, dated Oct. 10, 2014, regarding U.S. Appl. No. 12/170,843, 13 pages.
Office Action, dated Sep. 16, 2015, regarding U.S. Appl. No. 12/170,843, 10 pages.

* cited by examiner

MANDREL FOR AUTOCLAVE CURING APPLICATIONS

CROSS REFERENCE TO RELATED APPLICATIONS

This application is a continuation-in-part of U.S. patent application Ser. No. 12/170,843 filed Jul. 10, 2008, the entire disclosure of which is incorporated by reference herein.

TECHNICAL FIELD

This disclosure generally relates to mandrels used to form cavities in composite structures, and deals more particularly with a mandrel that is suitable for autoclave curing applications.

BACKGROUND

When composite materials are molded into structures having cavities, such as hat stringers, for example and without limitation, there may be a need for tooling that applies outward pressure from within the cavity during curing, and which can be removed from the cavity after curing. Existing tooling used for this purpose may include, without limitation, inflatable rubber mandrels; solid mandrels such as metal, rubber or composite mandrels; or dissolvable mandrels. Solid rubber or composite mandrel are sometimes preferred for certain applications, however when subjected to heat and pressure, this type of mandrel may produce a cavity having a distorted cross-sectional shape and/or may exert uneven pressure on the composite laminate.

Accordingly, there is a need for a removable mandrel that reduces or eliminates distortion of the cavity shape, and exerts substantially uniform pressure over the composite laminate during curing at elevated temperatures.

SUMMARY

The disclosed embodiments provide a removable mandrel used to cure a composite structure layup which may reduce or eliminate distortion of the structure caused by uneven application of pressure by the mandrel during curing. The mandrel includes one or more internal open spaces therein designed to allow the mandrel to thermally expand inwardly, while the exterior of the mandrel expands substantially uniformly to exert an even pressure over the layup. The even application of pressure to the layup may reduce or eliminate distortion of the cured structure.

According to one disclosed embodiment, a mandrel comprises an elastic body. At least one internal open space passes through the body, which is configured to allow substantially uniform thermal expansion of the body. The elastic body may comprise an elastomer, and the internal open space may be symmetric about the longitudinal axis of the body.

According to another embodiment, a mandrel is provided for curing a composite part layup comprising a generally solid body that expands when heated to apply pressure to the composite part layup. The body includes at least one internal open space therein positioned and configured to promote substantially uniform support for the part during layup and cure. The internal open space in the body may be elongate, and in one application may possess a generally daisy shaped cross section. In another variation, a plurality of the internal open spaces pass longitudinally through the body and are collectively configured to allow substantially uniform thermal expansion of the body.

A method embodiment provides for fabrication of a composite structure. A mandrel is formed and the thermal expansion characteristics of the mandrel are determined. The shape of an internal open space in the mandrel is selected which will result in substantially uniform thermal expansion of the mandrel during curing of the composite structure layup. An internal open space in the mandrel having the desired shape is formed, and a composite structure layup is placed over the mandrel, following which the layup is cured. Selecting the shape of the internal open space in the mandrel may be performed using finite element analysis. In one variation, a plurality of internal open spaces may be formed in the mandrel, which are collectively configured to allow substantially uniform thermal expansion of the mandrel body.

BRIEF DESCRIPTION OF THE ILLUSTRATIONS

DETAILED DESCRIPTION

Figure 1:
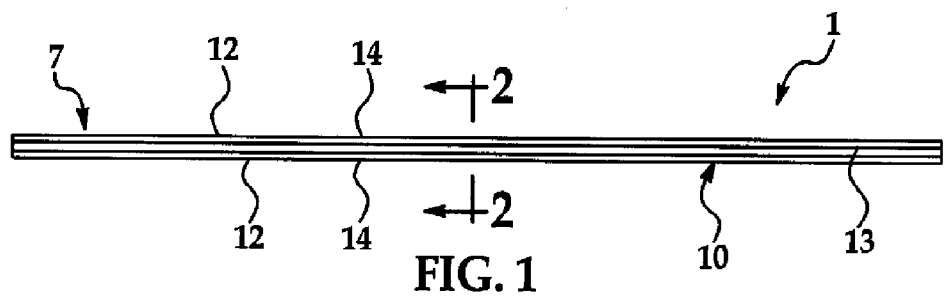
FIG. 1 is a top view of an illustrative embodiment of a mandrel.
Figure 2:
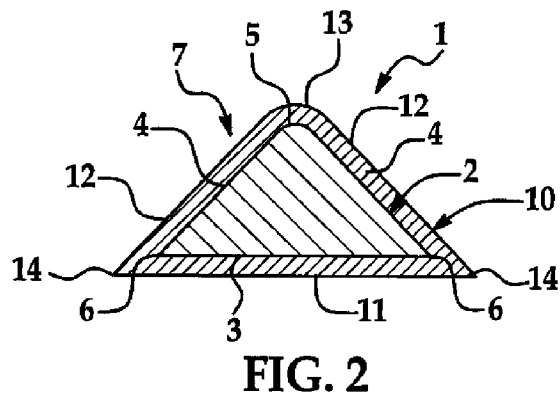
FIG. 2 is a cross-sectional view, taken along section lines 2-2 in FIG. 1, of the mandrel.

Referring initially to FIGS. 1 and 2, an illustrative embodiment of the mandrel is generally indicated by reference numeral 1. The mandrel 1 may be used to fill a cavity (not shown) in an airplane stringer or other open-cavity part (not shown) made from fiber/resin composite materials to prevent collapse of the cavity during curing of the composite materials. The mandrel 1 may be less costly, more durable and more effective and reliable than current inflatable bladder mandrel technologies.

The mandrel 1 includes a generally elongated mandrel body 7 having a mandrel core 2 which is a resilient material and a mandrel outer layer 10 which is disposed outside the mandrel core 2, as shown in FIG. 2, and is an elastomeric material. In some embodiments, the mandrel core 2 is foam or other such material which incorporates open space and/or air pockets to prevent bulk modulus behavior during thermal expansion and the mandrel outer layer 10 may be an elastomeric material such as elastic rubber, for example and without limitation. The mandrel core 2 and the mandrel outer layer 10 may be generally coextensive with the mandrel body 7.

The mandrel core 2 and the mandrel outer layer 10 may have any cross-sectional shape depending on the particular use requirements of the mandrel 1. In some applications, for example, each of multiple mandrels 1 may be suitably configured to fill respective stiffening elements (such as stringers) 27 during the curing and/or cocuring of a composite panel assembly 24, as shown in FIGS. 4-8 and will be hereinafter described. As shown in FIG. 2, in some embodiments of the mandrel 1, the mandrel body 7 may have a generally triangular cross-sectional shape. Accordingly, the mandrel core 2 has a generally flat or planar core base 3 with lateral core edges 6. Core sides 4 angle from the respective core edges 6. A core apex 5, which may be rounded, extends between the core sides 4. The shape of the mandrel outer layer 10 may generally correspond to that of the mandrel core 2, defining a mandrel base 11 which extends adjacent to the core base 3; a pair of mandrel sides 12 which extend adjacent to the respective core sides 4; a mandrel apex 13 which may be rounded and is disposed adjacent to the core apex 5; and mandrel edges 14 which correspond positionally to the respective core edges 6 of the mandrel core 2.

Figure 3:
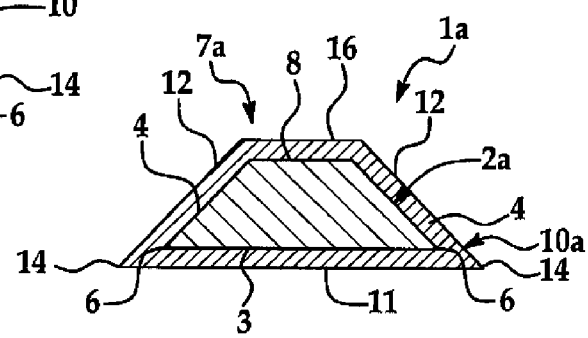
FIG. 3 is a cross-sectional view of an alternative illustrative embodiment of the mandrel.

As shown in FIG. 3, in some embodiments of the mandrel 1a, the mandrel body 7a may have a generally trapezoidal shape. Accordingly, the mandrel core 2a has a generally flat or planar core base 3; a pair of core sides 4 which angle from the core base 3; and a generally flat or planar mandrel core top 8 which extends between the core sides 4. The mandrel outer layer 10a defines a mandrel base 11 which extends adjacent to the core base 3; a pair of mandrel sides 12 which extend adjacent to the respective core sides 4; a generally flat or planar mandrel top surface 16 which is disposed adjacent to the mandrel core top 8; and mandrel edges 14 which correspond to the respective core edges 6 of the mandrel core 2a.

Referring next to FIGS. 4-8, in typical application, multiple mandrels 1 are inserted in respective stiffening elements 27 provided in a stiffening layer 26 of a composite panel assembly 24 during curing of the composite panel assembly 24. The composite panel assembly 24 will ultimately form an airplane stringer (not shown); however, it will be appreciated by those skilled in the art that the mandrels 1 can be adapted to fill cavities in any other type of open-cavity or closed-cavity composite material part made from fiber/resin composite materials during curing of the composite material part. The mandrels 1 can be adapted to fill cavities having a constant cross-sectional shape or a cross-sectional shape which varies along the length of the composite material, such as cavities which taper or curve along the length of the cavity, for example and without limitation.

Figure 4:
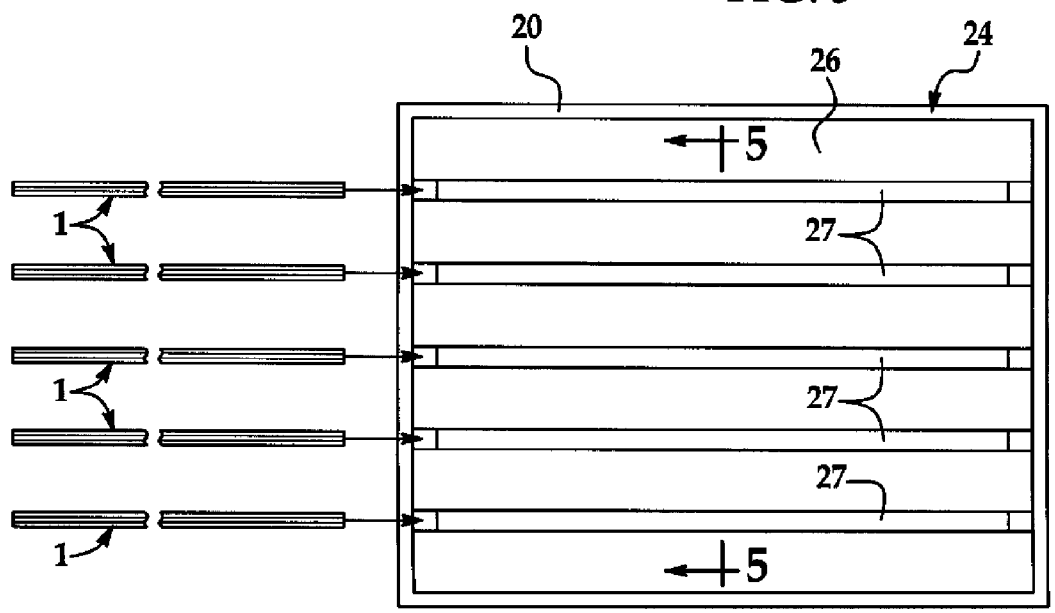
FIG. 4 is an exploded top view of a composite assembly, more particularly illustrating insertion of multiple mandrels into respective stiffening elements in the composite assembly preparatory to curing of the composite assembly.
Figure 5:
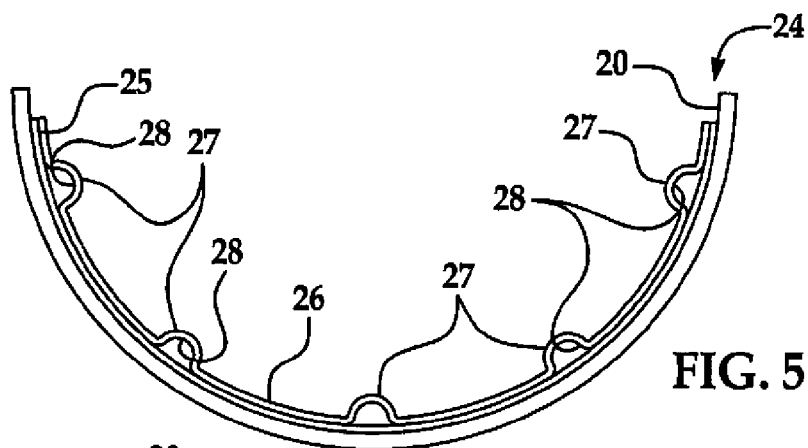
FIG. 5 is a cross-sectional view, taken along section lines 5-5 in FIG. 4, of the composite assembly.

As illustrated in FIG. 5, in an embodiment of fabrication of the composite panel assembly 24, a base composite layer 25 may initially be placed on a tooling surface 20 of OML tooling or IML tooling, for example and without limitation. The tooling surface 20 may have a generally concave contour, as shown. Alternatively, the tooling surface 20 may have a generally planar or convex contour, depending on the particular application. The stiffening layer 26 may be placed on the base composite layer 25. The stiffening elements 27 may be shaped in the stiffening layer 26 and extend along the longitudinal axis of the tooling surface 20 in generally parallel relationship with respect to each other, as shown in FIG. 4, and in generally perpendicular relationship with respect to the concave contour of the tooling surface 20. Alternatively, the stiffening elements 27 may be separate or discrete units. As further shown in FIG. 5, each stiffening element 27 has a stiffening element cavity 28. In some embodiments, the stiffening elements 27 may be oriented in orientations other than along the longitudinal axis of the tooling surface 20 and may converge or diverge, for example and without limitation.

Figure 6:
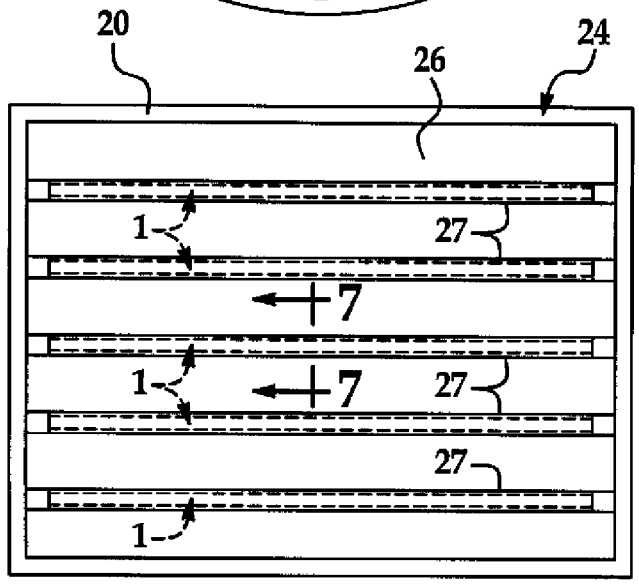
FIG. 6 is a top view of the composite assembly, with the mandrels inserted in the respective stiffening elements of the assembly.
Figure 7:
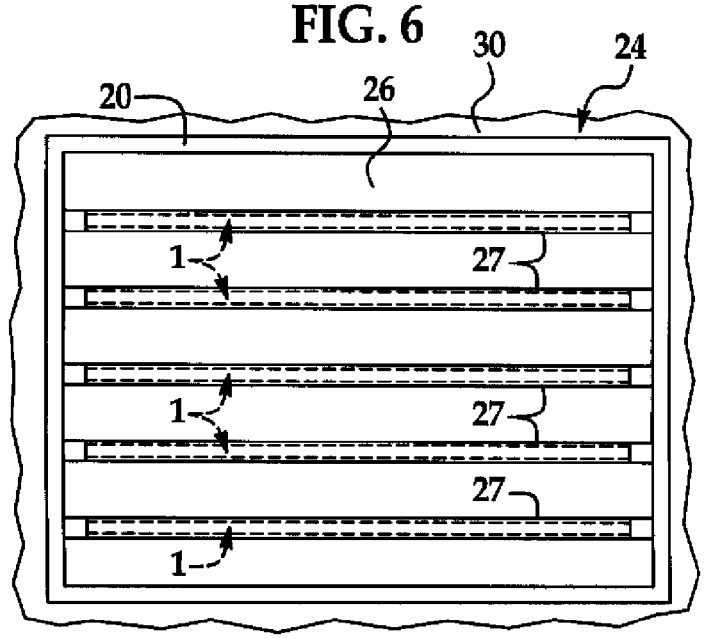
FIG. 7 is a top view of the composite assembly, contained in vacuum bagging preparatory to curing of the assembly.

As shown in FIGS. 4 and 6, multiple mandrels 1 may be inserted into the stiffening element cavities 28 of the respective stiffening elements 27. The elastomeric mandrel outer layer 10 of each mandrel 1 allows for a proper fit of the mandrel 1 into the stiffening element cavity 28 of each stiffening element 27 and conforms to pad-ups and ramps. As shown in FIG. 7, the composite panel assembly 24 may then be enclosed in vacuum bagging 30 and cured by autoclaving. During the curing process, the mandrels 1 maintain the shape and prevent collapse of the respective stiffening elements 27 as the composite material of the base composite layer 25 and the stiffening layer 26 hardens.

Figure 8:
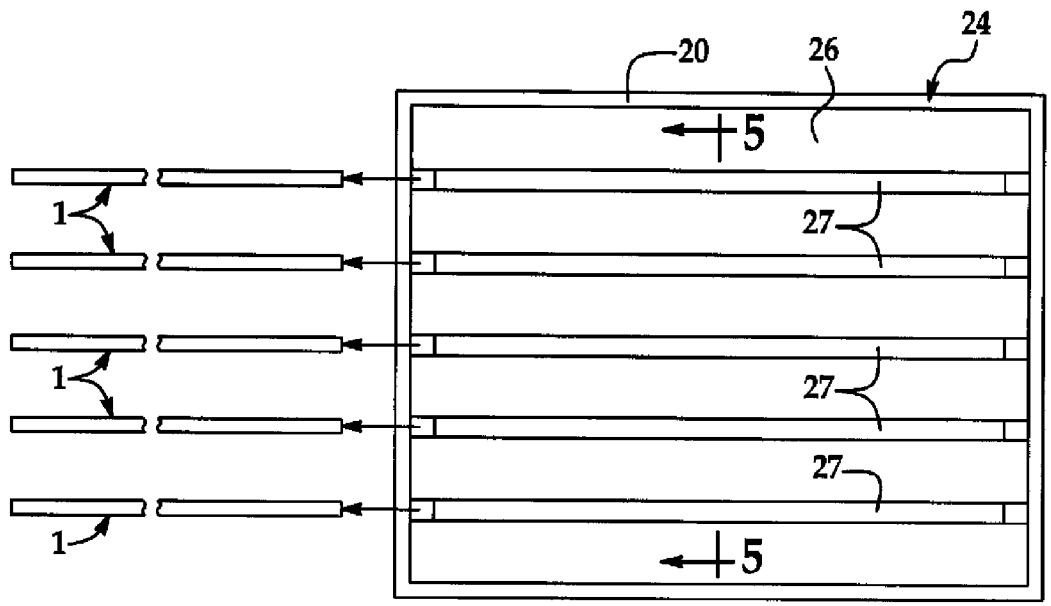
FIG. 8 is an exploded top view of the composite assembly, more particularly illustrating removal of the mandrels from the respective stiffening elements in the composite assembly after curing of the composite assembly.

After curing, the composite panel assembly 24 is removed from the vacuum bagging 30. The mandrels 1 may be removed from the stiffening element cavities 28 of the respective stiffening elements 27, as shown in FIG. 8. During removal, the elastomeric mandrel outer layer 10 of each mandrel 1 may easily be deformed; this reduces the effort required for removal. The cured composite panel assembly 24 may then be processed to complete fabrication of the airplane assembly (not shown) or other composite part, according to the knowledge of those skilled in the art.

It will be appreciated by those skilled in the art that the resilient mandrel core 2 of the mandrel 1 enhances the structural and compressive characteristics of the mandrel 1 relative to the designs of conventional mandrels. This structural and compressive support may be necessary to maintain the shape of the stringer or other composite part during automated composite fiber placement as well as autoclave curing. Since the outer mandrel layer 10 may be a constant thickness, it may expand uniformly during curing, thus avoiding the problems associated with uneven expansion of a solid rubber material. The cross-sectional area and type of foam used for the mandrel core 2 may be engineered to impart compression compliance under autoclave pressure, thus offsetting the combined thermal expansion behavior of the foam and rubber.

Figure 9:
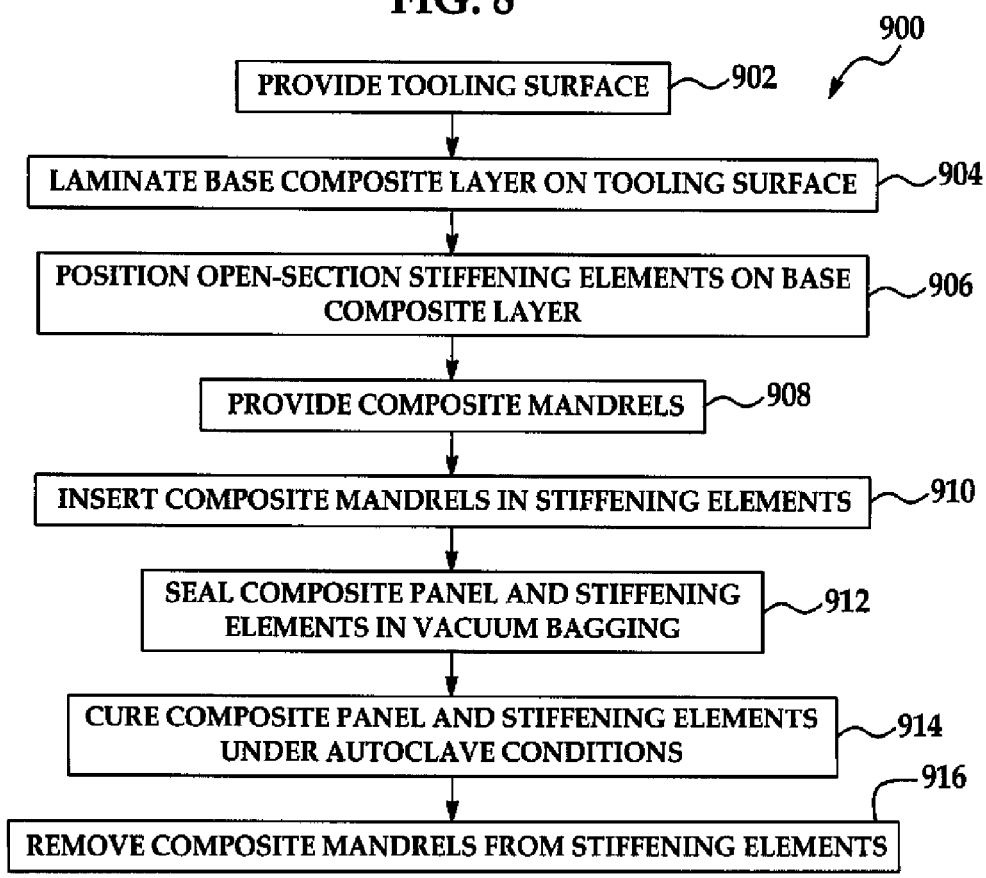
FIG. 9 is a flow diagram illustrating a method for fabricating a contoured stiffened composite panel.

Referring next to FIG. 9 of the drawings, a flow diagram 900 which illustrates an illustrative method for fabricating a contoured stiffened composite panel is shown. At 902, a tooling surface, such as the tooling surface 20 which was heretofore described with respect to FIG. 5, for example and without limitation, is provided. The tooling surface may have a concave, planar, convex or alternative contour. At 904, a base composite layer is laminated on the tooling surface. In step 906, open-section stiffening elements are positioned on the base composite layer. At step 908, mandrels are provided. Each mandrel includes a resilient mandrel core and an elastomeric mandrel outer layer disposed outside the resilient mandrel core. At step 910, mandrels are inserted in the respective stiffening elements. At 912, the composite panel and stiffening elements are sealed in vacuum bagging. In step 914 the composite panel and the stiffening elements are cured. An autoclave may be used during curing. Finally at step 916, the mandrels are removed from the stiffening elements.

Figure 10:
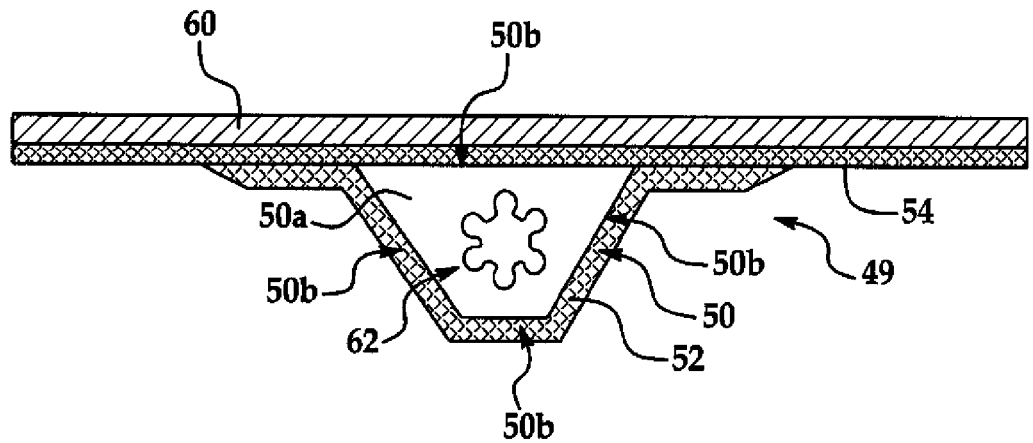
FIG. 10 is a cross sectional view of an alternate form of the mandrel having an internal open space for controlling thermal expansion, shown installed within a composite layup on a tool.
Figure 11:
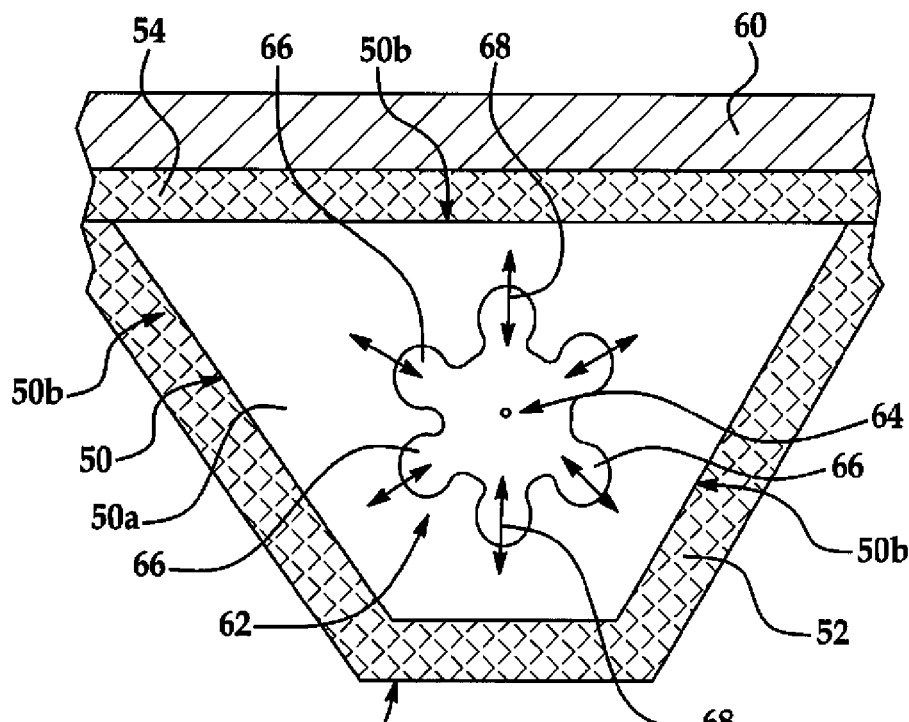
FIG. 11 is an enlarged view of a portion of the mandrel shown in FIG. 10, illustrating the substantially uniform thermal expansion of the mandrel during curing.
Figure 12:
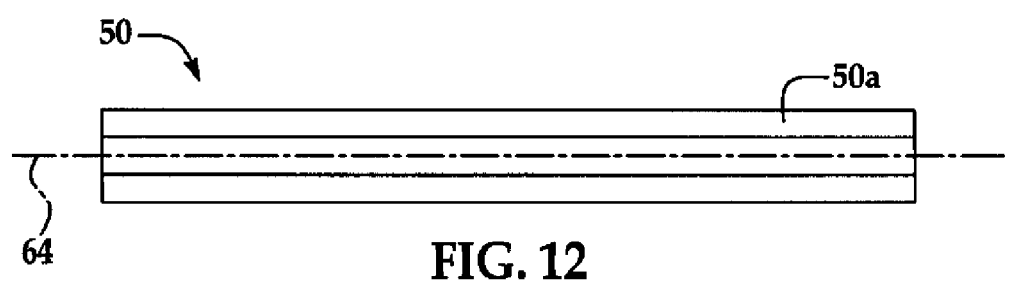
FIG. 12 is a top view of the mandrel shown in FIGS. 10 and 11.

Attention is now directed to FIGS. 10-12 which illustrate another embodiment of the mandrel 50 used to apply pressure to a composite structure 49 layup, such as for example and without limitation, a hat-shaped stiffer 52 joined to a composite skin 54. In this embodiment, the mandrel 50 is used to form hat stiffeners 52 that are made with cure tooling forming the surface of the hat and the skin side subject to autoclave pressure, in contrast to the previously described embodiments in which the cure tooling is used against the skin and the hat surface is subject to the autoclave pressure. The mandrel 50 defines and maintains the shape of the stiffener 52 during autoclave curing, with substantially even pressure and without substantial distortion. The composite structure layup 49 may be supported on a tool 60 within an autoclave (not shown) used to cocure the stiffener 52 and skin 54.

The mandrel 50 includes a generally solid body 50*a* that may extend the length of the stiffener 52. As used herein, "generally solid body" refers to a body that is substantially solid but may contain one or more open spaces 62 therein, as will be discussed below in more detail. The body 50*a* may be formed of an elastic material such as, without limitation, an elastomer or a rubber that is relatively soft, resilient and possesses a relatively low CTE (coefficient of thermal expansion) which may be less than the CTE of the composite structure layup 49. The resilient, elastic nature of the mandrel 50 allows it to conform to slight variations in the shape of the layup 49, while permitting the mandrel 50 to flex or bend slightly as it is being removed from the layup 49 after curing. In the illustrated embodiment, the mandrel body 50*a* has a substantially trapezoidal cross sectional shape, generally matching that of the stiffener 52. However the mandrel body 50*a* may possess any of a variety of cross sectional shapes depending on the application and the particular shape of the composite structure layup 49. Although not shown in the drawings, one or more of the open spaces 62 may be filled with material such as a foam having a low CTE.

The mandrel body 50*a* includes at least one internal open space 62 which, in the illustrated embodiment, passes longitudinally through the body 50*a*, substantially parallel to the longitudinal axis 64 (FIG. 12) of the body 50*a*. The location and shape of the internal open space 62 is configured to control the expansion of the body 50*a*, in a manner that results in the mandrel 50 exerting substantially uniform cure pressure against the stiffener 52 and the skin 54.

The open space 62 has a substantially daisy-shaped cross section which, in the illustrated example, is generally symmetrically disposed around the longitudinal axis 64. The longitudinal axis 64 passes the centroid of the cross section of the body 50*b* in the illustrated embodiment. In other embodiments, the cross sectional shape of the open space 62 may not be symmetric about the longitudinal axis 64. Generally, however, the cross sectional shape of the open space 62 will be symmetric about the mid-plane of the stiffener 52, defined as a plane that is perpendicular to the skin 54. The daisy-shaped open space 62 comprises a plurality of circumferentially spaced lobes 66, and is merely illustrative of a wide variety of shapes that may be possible for achieving substantially even thermal expansion of the outer surfaces 50*b* of the mandrel body 50*a*.

As previously noted, the particular shape chosen for the open space 62 will depend upon the geometry of the composite structure layup 49, including the shape of the cavity filled by the mandrel 50. The shape and placement of the open space 62 may be selected and optimized using finite element analysis which may indicate the amount of expansion of the mandrel body 50*a* at various temperatures during cure, and the corresponding pressures applied to the composite structure layup 49. The finite element analysis may be carried out using any of several commercially available software packages. Finite element analysis may be used as a predictive numerical tool to model and analyze the laminate cure process of the composite structure and to optimize the internal open space 62 in the mandrel 50 to specified tolerances.

During the thermal cycling used to effect cure of the composite structure layup 49, substantially uniform expansion of the outer surfaces 50*b* of the mandrel body 50*a* is achieved as a result of the mandrel body 50*a* expanding into the open space 62. The essentially concurrent outward expansion of the mandrel surfaces 50*b* and the inward expansion of the mandrel body 50*a* into the open space 62 is indicated by the arrows 68.

Figure 13:
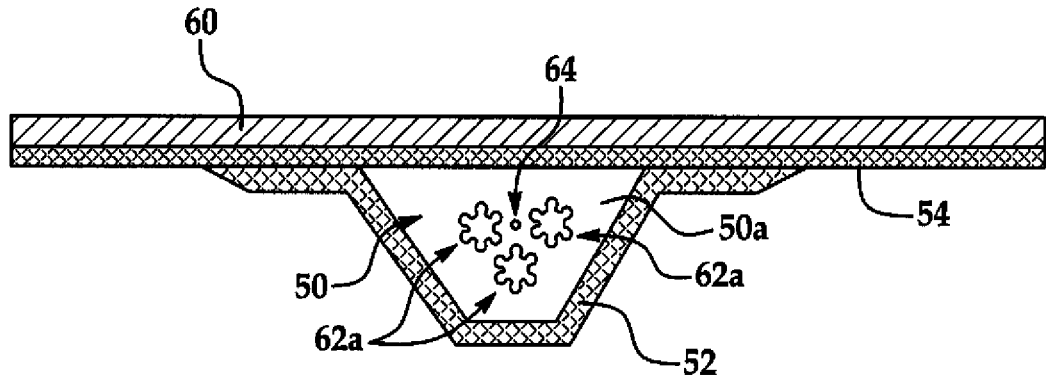
FIG. 13 is a cross sectional view similar to FIG. 10, but showing another form of the mandrel having multiple internal open spaces for controlling thermal expansion.

Referring now to FIG. 13, in contrast to the single internal open space 62 shown in FIGS. 10 and 11, it may be useful to employ a plurality of longitudinal internal open spaces 62*a* within the mandrel body 50*a* to control thermal expansion of the mandrel body 50*a*. In the illustrated example, three longitudinal internal open spaces 62*a* are arranged in a generally triangular pattern, roughly evenly spaced from the longitudinal axis 64 of the mandrel 50. Each of the longitudinal open spaces 62*a* possesses a daisy-shaped cross section, however as previously indicated, a variety of other shapes may be possible.

Figure 14:
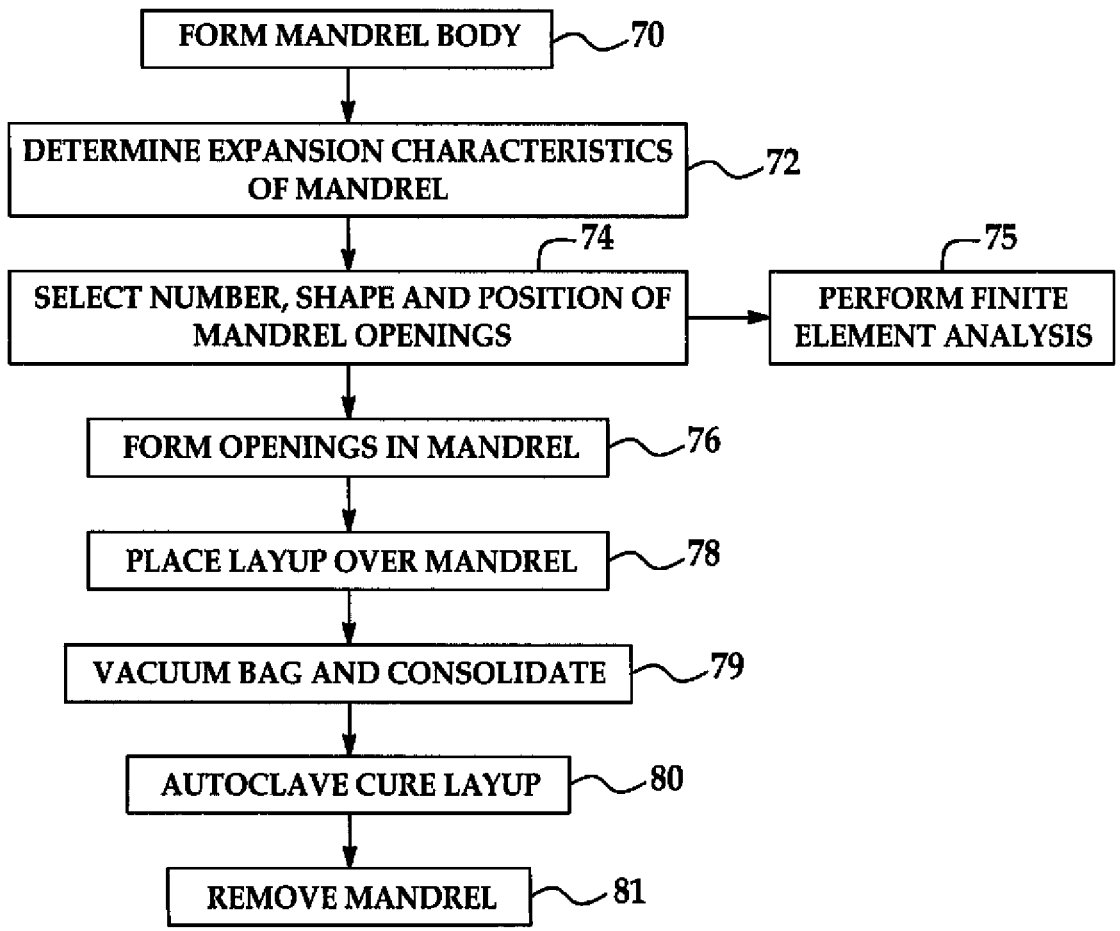
FIG. 14 is a flow diagram illustrating a method of producing and using the mandrel shown in FIGS. 10-13.

Attention is now directed to FIG. 14 which broadly illustrates the steps of a method of fabricating a composite structure using the mandrel 50 shown in FIGS. 10-13. Beginning at step 70, the mandrel 50 is formed by any of a variety of fabrication techniques, such as molding an elastomeric material. Next at 72, the expansion characteristics of the mandrel 50 are determined based on its geometry, dimensions and material. At 74, the number, shape and position of the internal open spaces 62 are selected which may be accomplished, at least in part, by performing a finite element analysis, as indicated at step 75. At 76, the selected open spaces 62 may be formed in the mandrel 50 by any of a variety of the fabrication techniques. The openings 62 may be formed in the mandrel 50 at the same time the mandrel body 50*a* is formed, in step 70, as by molding. At 78, a composite structure layup 49 is placed over the mandrel 50, or alternatively, the mandrel 50 is placed inside an existing layup 49. The assembly of the mandrel 50 and layup 49 is then vacuum bagged at 79 in order to form and consolidate of the layup 49. The vacuum bagged assembly of the layup 49 and the mandrel 50 is placed in an autoclave (not shown) where it is cured at step 80. Following curing, the mandrel 50 is removed from the cured layup 49 at 81. The elasticity of the mandrel 50 allows it to deform slightly to facilitate its removal, as it is either pushed or pulled from the layup 49 during the removal.

Figure 15:
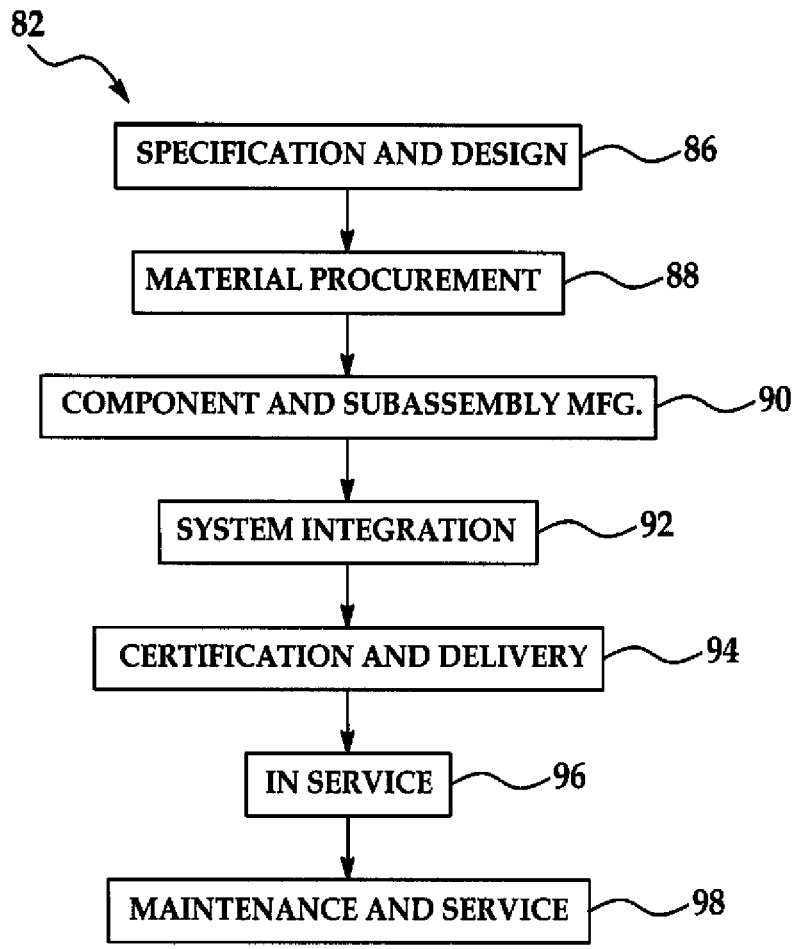
FIG. 15 is a flow diagram of an aircraft production and service methodology.
Figure 16:
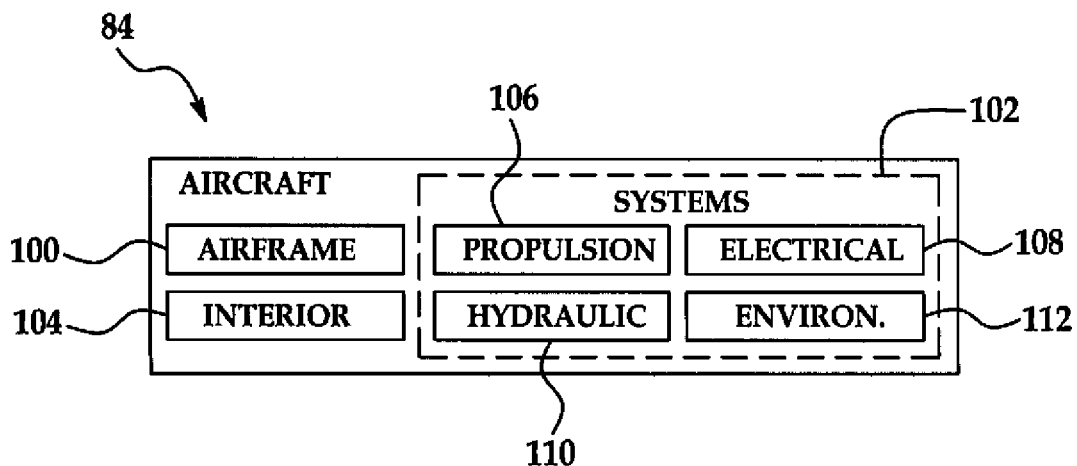
FIG. 16 is a block diagram of an aircraft.

Referring next to FIGS. 15 and 16, embodiments of the disclosure may be used in the context of an aircraft manufacturing and service method 82 as shown in FIG. 15 and an aircraft 84 as shown in FIG. 16. During pre-production, exemplary method 82 may include specification and design 86 of the aircraft 84 and material procurement 88. During production, component and subassembly manufacturing 90 and system integration 92 of the aircraft 84 takes place. Thereafter, the aircraft 44 may go through certification and delivery 94 in order to be placed in service 96. While in service by a customer, the aircraft 84 may be scheduled for routine maintenance and service 98 (which may also include modification, reconfiguration, refurbishment, and so on).

Each of the processes of method 82 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 84 produced by exemplary method 82 may include an airframe 100 with a plurality of systems 102 and an interior 104. Examples of high-level systems 102 include one or more of a propulsion system 106, an electrical system 108, a hydraulic system 110, and an environmental system 112. Any number of other systems may be included. Although an aerospace example is shown, the principles of the invention may be applied to other industries, such as the automotive industry.

The apparatus embodied herein may be employed during any one or more of the stages of the production and service method 82. For example, components or subassemblies corresponding to production process 90 may be fabricated or manufactured in a manner similar to components or subassemblies produced while the aircraft 84 is in service. Also, one or more apparatus embodiments may be utilized during the production stages 90 and 92, for example, by substantially expediting assembly of or reducing the cost of an aircraft 84. Similarly, one or more apparatus embodiments may be utilized while the aircraft 84 is in service, for example and without limitation, to maintenance and service 98.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a composite part, comprising:
   forming a mandrel, said mandrel a single unitary component having a generally solid body of elastic material;
   determining thermal expansion characteristics of the mandrel;
   forming at least one internal open space in the mandrel that will result in substantially uniform thermal expansion of the mandrel during curing of the composite part, thereby creating an opening in the mandrel, and forming includes selecting, based on the thermal expansion characteristics, a shape of the opening that will result in the substantially uniform thermal expansion;
   placing a composite part layup over the mandrel; and
   curing the composite part.

2. The method of claim 1, further comprising:
   selecting the shape of the opening using finite element analysis.

3. The method of claim 1, wherein forming the at least one internal open space and forming the mandrel are performed substantially simultaneously.

4. The method of claim 1, wherein forming the at least one internal open space includes forming an opening passing longitudinally through the mandrel.

5. The method of claim 1, further comprising:
   forming a plurality of internal open spaces in the mandrel body collectively configured to allow substantially uniform thermal expansion of the body.

6. The method of claim 1, wherein forming the at least one internal open space includes selecting a cross sectional shape and a position of the at least one internal open space within the mandrel.

7. The method of claim 1, wherein curing the composite part layup is performed in an autoclave.

8. A method of fabricating a composite part, comprising:
   selecting an elastic mandrel material;
   determining thermal expansion characteristics of the elastic mandrel material;
   selecting an external shape of the mandrel;
   forming the elastic mandrel material into the selected mandrel shape, said mandrel a single unitary component having a generally solid body;
   performing, using the thermal expansion characteristics, a finite element analysis to determine a size, a number, and a cross sectional shape of a plurality of internal open spaces within in the mandrel that will result in substantially uniform thermal expansion of the mandrel;
   forming the internal open spaces within the mandrel based on results of the finite element analysis;
   placing a composite part layup over the mandrel; and
   curing the composite part in an autoclave using the mandrel.

* * * * *